United States Patent [19]

Ashmore

[11] Patent Number: 5,086,300
[45] Date of Patent: Feb. 4, 1992

[54] METHOD AND SYSTEM FOR PASSIVE DETECTION OF ELECTROMAGNETIC EVENTS ASSOCIATED WITH DESTRUCTIVE DEVICES

[76] Inventor: George A. Ashmore, 1725 Millmar Cir., Dallas, Tex. 75228-3749

[21] Appl. No.: 529,422

[22] Filed: May 29, 1990

[51] Int. Cl.[5] .............................................. H04K 3/00
[52] U.S. Cl. ...................................... 342/20; 342/351
[58] Field of Search ................... 342/175, 61, 20, 351; 455/227, 1, 229

[56] References Cited

U.S. PATENT DOCUMENTS

| | | |
|---|---|---|
| 2,404,441 | 7/1946 | Hopkins . |
| 2,917,927 | 12/1959 | Clark . |
| 3,075,461 | 1/1963 | Ehlmann . |
| 3,255,352 | 6/1966 | Johnston . |
| 4,368,539 | 1/1983 | Whidden ........................ 455/226 X |
| 4,455,179 | 6/1984 | Yamaguchi . |
| 4,866,439 | 9/1989 | Kraus . |
| 4,887,086 | 12/1989 | Unser et al. ........................... 342/20 |
| 4,951,058 | 8/1990 | Schriner et al. ...................... 342/61 |

OTHER PUBLICATIONS

Davis Aircraft Co., Inc.: Acousti Sensor Model 6500, 3/75 (3 pages).
Martin L. Kaiser, Inc.: 2079 RCM Radio Current and Magnetic Probe and 7079X Advanced Stethoscope: 5/75 (Brochures).
"Hidden Electronics Detection", by Michael K. Ferrand, appearing in *The 1988 IEEE MTT-S Digest* at pp. 1035-1037.

*Primary Examiner*—Mark Hellner
*Attorney, Agent, or Firm*—David H. Judson

[57] ABSTRACT

The apparatus of the invention detects, characterizes and evaluates electromagnetic radiation, primarily in the radio frequency range, which is emitted by the fusing portion of the explosive train found in certain destructive devices. The apparatus includes a chamber for containing items to be tested, such as airline luggage, in a sealed or confined environment shielded from outside radiation and subjecting any fusing devices, which may be located in such items, to the condition or conditions under which such devices are activated. The invention further includes equipment for receiving, detecting, and evaluating any electrical signals emitted by such fusing devices. The invention is primarily for use in determining the presence of hazards in aircraft cargo but can easily be adapted for other uses.

17 Claims, 1 Drawing Sheet

METHOD AND SYSTEM FOR PASSIVE DETECTION OF ELECTROMAGNETIC EVENTS ASSOCIATED WITH DESTRUCTIVE DEVICES

BACKGROUND OF INVENTION

1. Field of the Invention

This invention relates to apparatus for detecting, characterizing and evaluating electromagnetic radiation, primarily in the radio frequency (RF) range, which is emitted by the fusing portion of the explosive train found in certain destructive devices. The apparatus includes a system for containing cargo, such as airline luggage, in a sealed or confined environment shielded from outside radiation and subjecting any fusing devices, which may be located in such cargo, to the condition or conditions under which such devices are activated. The invention further includes equipment for detecting any electrical signals emitted by such fusing devices.

2. Description of the Prior Art

The introduction of explosive devices into aircraft and transportation vehicles through passenger luggage is a danger heightened by recent events. The presence of such devices endangers the lives of passengers on board aircraft or other vehicles and, on occasion, has resulted in loss of life. Numerous attempts have been made in the prior art to prevent the introduction of such devices into public conveyances. Specially-trained animals have been used to identify the presence of explosives and have, in some cases, been successful in preventing explosive devices from being placed on board aircraft. Specially-designed explosive detectors are commercially available and have been proposed for use in aircraft and in luggage-handling areas. One such proposal is found in U.S. Pat. No. 4,866,439 issued Sept. 12, 1989 to John H. Kraus, which discloses an explosive detection system for commercial aircraft. The Kraus patent proposes the incorporation of detectors in the air ducting of the aircraft itself. Kraus notes that the use of such detectors in luggage areas has proved difficult because of the inherent time delay in the operation of explosive detectors of the type which he proposes to use. Such explosive detectors sense the presence of explosives through detection of odor or other airborne indicia of the presence of explosive material. The significant delay in the detection capability of such device has made them impractical in most applications.

Other techniques include the purposeful detonation of explosives in luggage. One such technique is disclosed in U.S. Pat. No. 3,075,461 issued Jan. 23, 1963 to Irwin Ehlmann. The Ehlmann patent discloses the use of a sweep frequency transmitter designed to detonate RF-sensitive blasting caps. The Ehlmann device is impractical because detonation of the cap causes a dangerous explosion. Also the luggage is always needlessly destroyed when this technique is used. The Ehlmann device is only effective when the detonator is sensitive to a specific frequency. Others have proposed the construction of explosion chambers for pressurizing or creating a partial vacuum in a confined area to test the explosive capability of devices. One such chamber is disclosed in U.S. Pat. No. 2,917,927 issued Dec. 22, 1959 to George F. Clark. Such chambers are of little value in detecting explosive devices because, although a pressure change may activate the device, the prior art has shown no way in which such device, once activated, could be detected.

The detection of a pressure sensitive device which initiates the electronic timer for an explosive device is an important problem which has not been properly addressed in the prior act. By the use of such devices in airline luggage, a terrorist can ensure that an aircraft is well into flight or over the ocean before any explosive device is activated. The present invention addresses this problem among others.

SUMMARY OF INVENTION

The object of the present invention is to provide apparatus for detecting the presence of timing, explosive initiating or detonating devices or other hazardous or dangerous devices disguised or hidden within containers such as airline passenger luggage, postal packages, boxes or crates, radio receivers, personal computers, calculators or other similar electronic devices or the cabinet structures for such devices. A further object of the invention is to provide a method and apparatus to efficiently and safely evacuate air from the area around such items for a sufficient time so that pressure-sensitive fusing or timing devices can be activated and their presence determined. Another object of the invention is to provide a safe containment area to control any explosive over-pressure resulting from the possible detonation of any explosive devices contained in the item, luggage or cargo during the examination by the apparatus of the invention. A further object of this invention is to provide an evaluation device useful in numerous operating environments so that it can evaluate cargo or other material which is to be transported by air, sea or land and, in future applications, perhaps even through space travel. Another object of the invention is to provide a portable evaluation device usable at check points or border crossings or in any operating environment where mobility is an advantage.

The present invention, in one of its preferred embodiments, consists of a confined or sealed containment area which can be efficiently and effectively evacuated to a low air pressure simulating changes in altitude, as in an aircraft, and which is capable of maintaining such reduced pressure for a sufficient time to conduct the required evaluation for the presence of suspicious RF energy. In one embodiment of the invention, the confined area of the containment apparatus may be connected to the outside environment through baffles or a long tunnel so that a partial vacuum can be maintained in the area under test. Such containment area need not be sealed and unsealed for each test procedure. In another embodiment of the invention, a sealed chamber is used to provide for rapid production of a partial vacuum. In one embodiment, the containment area may be of sufficient size so that luggage carts, such as used on a luggage-loading dock, can be easily placed within the area and evaluated for any electromagnetic radiation emitted from the luggage when explosive or timing devices are activated. In another embodiment, the chamber may be of such size that individual items or pieces of luggage may be placed in it for test. The containment area is a reenforced chamber incorporating an antenna, a test signal generator, an entry area or port, which may be sealable and a highspeed handling system for moving cargo and other luggage items through the containment chamber.

Supporting the containment chamber is a vacuum system including a remotely controlled vacuum pump and vacuum storage tank of sufficient volume to evacuate the containment chamber in adequate time to process items through the chamber at a reasonable rate. Preferably, the vacuum pump should be resistant to interference from electromagnetic energy. The vacuum storage tank should have adequate volume for maintenance of the required sequential testing rate. The vacuum pump and storage tank are operated under computer control responsive to a pressure transponder. The containment chamber is also responsive to a vacuum control system which regulates the evacuation of the containment area and its venting for normalization of pressure when each test procedure has been completed.

The detection, characterization and reporting elements of the system are supported by an antenna incorporated in the containment area. The antenna is compatible with the frequency range needed to adequately test the luggage in question. The antenna is sized proportional to the volume of the containment area under test. The antenna may be fixed or movable. It is located within the containment area or chamber and may be divided into segments so that it can resolve the spatial coordinates within the containment area of any suspected device detected by the system. A low-noise receiver with a gain matched to the detection element of the invention is connected to the antenna. Preferably, the receiver should have a flat frequency response over the frequency range under examination. The receiver requires proper interface to the detection device of the invention.

The detection characterization and reporting elements of the invention also include an RF detection device with high dynamic range and capable of interfacing with a computer device. The detection device of the invention should have high sensitivity and a low false-alarm rate. The detection device provides input to a computer for evaluation of any detected RF emissions.

Preferably, the computer also controls the various operational functions of the containment area, including the vacuum pump, storage tank, and their control. The computer should also have a data output through modem or display. The computer should also, preferably, have adequate memory storage devices and be network-capable. The computer of the invention should be programmed to drive the detection apparatus and analyze any output therefrom. Preferably, the computer should be connected to a modem which includes cryptographic capability. The computer includes a self-diagnostic feature so that it can evaluate the integrity of its own programming. The apparatus of the invention is supported by a power source with proper voltage output for all the various elements of the system. The containment area of the invention is also connected to a signal test generator operated under computer control to provide a test capability for the containment area antenna and detection system.

In another preferred embodiment of the invention, the detection, characterization and reporting system is portable and the antenna element of the invention can be incorporated in a hand held unit which is passed by an operator over the package, cargo, or luggage in question. The portable system can be used within an aircraft or other vehicle or at any cargo or luggage handling area. The portable system can also be used in mail rooms or at building security check points where individual items carried by visitors require evaluation. This portable system, including its hand held antenna, can be made waterproof for underwater applications.

DETAILED DESCRIPTION OF PREFERRED EMBODIMENT

The detection, characterization and reporting system of the invention senses electromagnetic radiation emitted from articles positioned within a containment area. The radiation in question is principally of the radio frequency (RF) type. The detection apparatus of the invention has the ability to detect electromagnetic events associated with active or passive electrical fusing for the initiation or detonation of an explosive, hazardous or other dangerous destructive device. The detection apparatus will sense the presence of continuously operating long-delay timing mechanisms, or a single event initiating device which activates a delay device which may not itself emit RF energy. Such single event devices can be electronic or mechanical closure devices triggered by ambient conditions such as changes in atmospheric pressure. The device detects, evaluates and reports the presence of most electrical phenomena associated with active electrical detonating or fusing devices during the normal duty cycle of such devices. In the alternative, the apparatus of the invention activates such detonating or fusing devices by duplicating the actual conditions under which the devices are designed to be activated.

The detection device of the invention is sensitive to the electromagnetic radiation from all types of clock or timing chips or other electronic timing or activation devices, including travel alarm clocks, remote activated beepers or radio receivers.

The invention includes a containment area or chamber with an air evacuation device which reduces the pressure in the chamber to the barometric pressure at specific altitudes. In such environment, devices which are activated by a barometric pressure switch can be detected because they will begin to emit RF energy.

Figure 1:
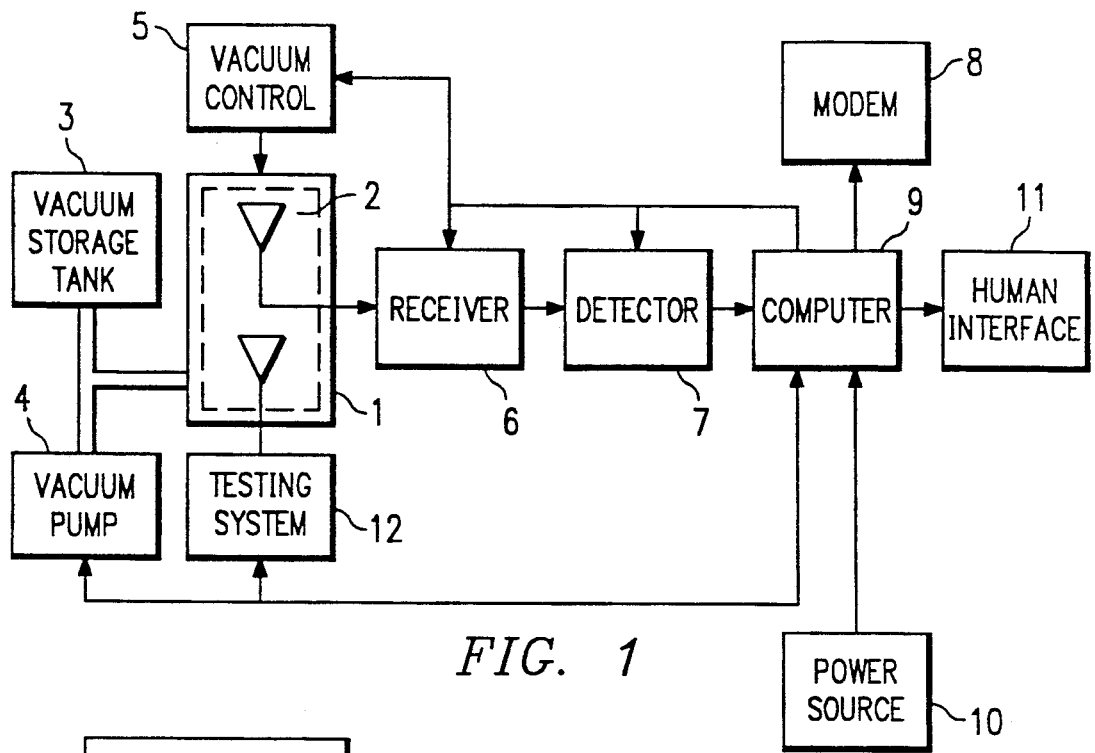
FIG. 1 is a block diagram of the major elements of the invention indicating their operable relationship.

Referring to FIG. 1, the invention includes a containment area or altitude chamber 1. This structure is either a confined or sealed chamber which can be evacuated in a reasonably rapid time and maintained at a partial vacuum. The chamber may be baffled or sealed so long as an adequate partial vacuum can be maintained. The chamber incorporates a luggage or cargo handling system so that material under test may be efficiently passed through the chamber The altitude chamber or containment area 1 is shielded to outside electromagnetic radiation so that very low level RF radiation can be detected. The containment area 1 is adequate in size to receive luggage carts or similar apparatus typically used to handle luggage in airports or other terminals or, in the alternative, to receive individual items, pieces of luggage, or cargo. The containment area is constructed to include explosive overpressure vents (not shown). The vents are closed with frangible members which open under explosive pressure. The vents direct any overpressure from an explosive event to a safe area away from the containment area. The vents are also constructed to direct towards a safe area other hazardous overpressure events such as from an incendiary device.

Incorporated within the containment area structure is a broadband antenna 2. The antenna 2 has the frequency response needed to provide adequate reception over the frequency range required to detect the various electromagnetic events associated with fusing or detonating devices. The broadband antenna 2 is a high-impedance device which includes a switching element (not shown) to allow individual antenna elements (not shown) in different portions of the containment area to be tested for suspected items. This switching feature of the antenna allows particular areas within the containment structure to be inspected individually so that the precise location of suspected items can be identified. In the alternative, the antenna may be rotatable or mobile to determine the location of suspected items in the containment area. In another embodiment of the invention, a number of antennas can be positioned at different locations within the containment area structure. Radio frequency energy in the area can be localized by determining the relative field strengths on the various antennas when each is individually and sequentially connected to the receiver and detector elements of the invention. An interferometer may also be used for this purpose.

The pressure within the containment area is controlled by a vacuum system, including a vacuum storage tank 3, a vacuum pump 4 and interconnecting plumbing made of grounded copper piping. The vacuum storage tank 3 is a large-volume tank which can evacuate the containment area for the required sequential testing. The vacuum pump 4 is a high-volume pump resistant to electromagnetic interference and capable of control by a digital computer 9.

The invention also incorporates a digital computer 9 which, among other things explained in detail below, is programmed to control the vacuum system. The vacuum control system 5 includes a linear pressure transponder (not shown) which provides sensor output to the computer so that particular pressure levels or altitudes can be detected and controlled. The computer 9 is also programmed to allow venting of the containment area after each test cycle. The computer 9 controls the vents to chamber 1 and thereby achieves pressure normalization at specified intervals under controlled conditions.

The output of the antenna 2 is inputted to a radio frequency receiver 6. One element of this receiver is preferably a superheterodyne stepped tuned receiver for high frequency coverage. An example of such receiver is the Hewlett Packard HP-8566A radio frequency spectrum analyzer. The radio frequency receiver of the device also includes as a second element a multiple-contiguous band receiver for low-frequency coverage. An example of such receiver is the Hewlett Packard HP-3561 radio frequency spectrum analyzer. These receiver elements are low-noise receivers with gain matched for use with an analog digital converter (not shown) to provide the proper interface to detector 7 and computer 9. The receiver elements should include a low-frequency roll-off response over the entire frequency coverage to be examined. Further, proper filtering within the receiver elements is needed to provide for the integrity of the input to detector 7. The receiver 6 incorporates a standard local oscillator (not shown), which is digitally controllable by the computer 9. This local oscillator is a standard direct digital synthesizer which is stepped to the specific frequency increments needed to sweep the RF frequencies which are to be examined in the containment area. The local oscillator has a tuning time compatible with the test interval and a low spurious output. Although the spectrum analyzers enumerated have been proved effective for use in the invention, any swept frequency superhetrodyne or compressive channelized receiver, either with multiple-contiguous or non-contiguous bands, or any tunable receiver, either fixed tuned or stepped tuned, could be used as a receiver element in the invention.

The output of the receiver 6 is inputted to a detector 7 which is preferably a digital signal processor using frequency domain detection. Other detector apparatus may be used such as a rectification element with a low pass filter, a video logarithmic amplifier or a correlation detector. In any event, the detector element of this invention should have a high dynamic range and be compatible with the receiver 6 at the receiver's dynamic range. The processing speed of the signal processor detector 7 must be compatible with the sampling rate of the real time processing programming of the computer 9. The computer 9 is programmed to receive and process the output of the signal processor detector 7 to determine the presence of any radiation within the suspected bands and evaluate that radiation. When more than one antenna is used, the computer 9 is programmed to successively connect each antenna to the receiver 6 and the various frequency ranges are swept. The detector 7 determines the field strengths on the various antennas in the specified frequency ranges. From this information, the computer can determine the angles of arrival of any suspicious radio frequency energy on the various antennas. This technique accelerates location resolution when using the invention.

The computer 9 interfaces with the vacuum pump 4, vacuum control 5, and the local oscillator of the receiver 6 to control the operation of the containment structure 1 to conduct a test of its contents. The computer activates the pump and vacuum control to bring the chamber to the required pressure for diagnosis. The computer 9 then drives the receiver 6 through the various frequency bands to receive any RF emission from timing or explosive devices within the items in the containment structure. The computer 9 then directs any received signals to the detector 7. The computer 9 includes a diagnostic program to determine the presence of suspect radiation. The computer is programmed to evaluate such suspect radiation. The computer 9 can receive signals from specified areas within the containment structure 1 so that the computer can resolve the specific location of suspicious radiation in the containment structure. The computer 9 is also provided with a self-diagnostic capability to test the responsiveness the antenna 2, receiver 6 and detector 7. This evaluation program also tests the computer's own programming.

The computer 9 can be connected through a modem to other data processing facilities or to a host computer at a remote site. The output of the computer is inputted to a human interface 11. The human interface can include a display device capable of displaying information respecting the condition of the test system, the most recent test performed the presence and location of any suspect radiation in the containment area and any evaluation of the device emitting the suspect radiation.

Alternatively, the invention may be incorporated in a portable unit. In this embodiment of the invention, the antenna is located in a hand held structure which can be passed by an operator over the materials under test.

Figure 2:
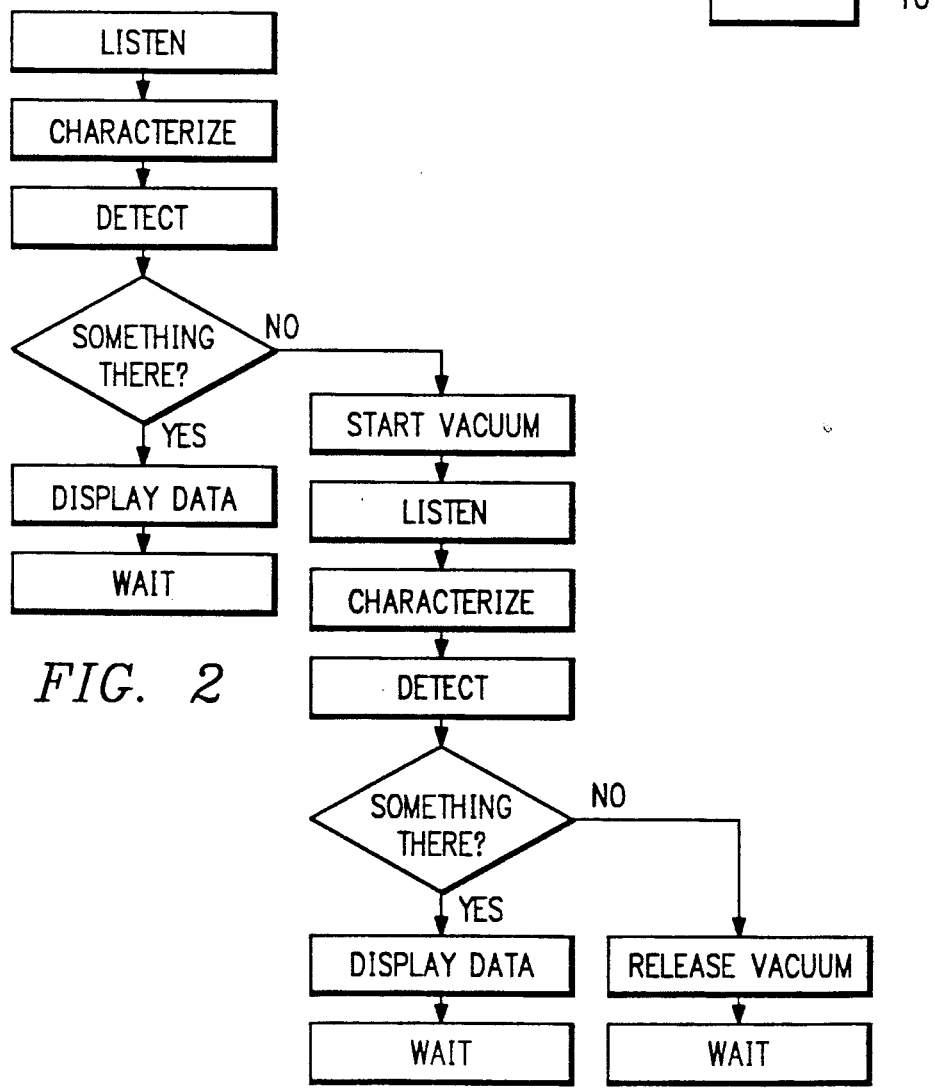
FIG. 2 is a flow chart of the sequencing by which the elements of the invention are operated to test for the presence of a detonator device.

FIG. 2 shows a typical flow chart of the sequence of operation of the detection system of the invention. Luggage is positioned in the containment area and the detection system first characterizes the presence of any RF energy emitted by tested materials to determine whether such energy is associated with a timing or fuse device or is simply a harmless emission. If any energy is detected, information on the energy is displayed at the human interface where further evaluation can be made. If no radio frequency energy is detected, the computer 9 commands the evacuation of the containment area and then characterizes and detects any suspicious RF energy. Again, if any suspicious radio frequency energy is detected, data is displayed concerning the energy at the human interface and appropriate action can be taken. If no energy is detected, the containment area vacuum is released and the next testing cycle can be undertaken. The detection system of the invention is uniquely adapted to determine the presence of any explosive or hazardous apparatus. Any electronic device in cargo which operates only after passing through a particular atmospheric pressure is highly likely to be dangerous. The present invention will detect devices hidden in small electronic devices, such as radios, calculators, etc., and which are not usually located by x-ray or physical searches.

While a preferred embodiment of the detection system has been described herein, those skilled in the art will recognize various alternative designs and embodiments for practicing the present invention as defined by the claims.

What I claim is:

1. A passive detector system for detecting low intensity radio frequency emissions from an apparatus that may include a fusing portion of an explosive train, comprising:
    antenna means positioned to receive low intensity radio frequency energy originating from the apparatus in a sepcified area, wherein the specified area includes an automatic material handling means for transferring materials into the specific area for evaluation;
    receiver means connected to said antenna means for selecting predetermined frequency ranges for reception and amplifying any low intensity radio frequency energy received in said ranges;
    detector means connected to said receiver means for quantifying the received low intensity radio frequency energy; and
    computer means connected to said detector means for evaluating and characterizing the detected radio frequency energy.

2. A detector system as claimed in claim 1 wherein the specified area is shielded from outside radio frequency emission.

3. A detector system as claimed in claim 1 wherein the receiver means and detector means are operated under the control of the computer means.

4. A detector system as claimed in claim 1 wherein the antenna means is a multi-element device incorporating a switch means so that specific areas within the specified area can be sensed for radio frequency energy.

5. A detector system as claimed in claim 1 wherein the antenna means is movable so that the specific locations of the radio frequency energy within the specified area can be determined.

6. A detector system as claimed in claim 1 wherein the computer means for evaluating and characterizing any detected radio frequency energy is connected to a human interface means for the display of information on said detected radio frequency energy developed by said computer means.

7. A detector system as claimed in claim 1 wherein the computer means for evaluating and characterizing any detected radio frequency energy is connected to a modem for the transfer of data on detected radio frequency energy developed by said computer means to a remote site.

8. A detector system for detecting low intensity radio frequency emissions comprising:
    a. antenna means positioned to receive radio frequency energy from a specified area, said specified area being a vacuum chamber which can be evacuated to a partial pressure;
    b. receiver means connected to said antenna means for selecting predetermined frequency ranges for reception and amplifying any radio frequency energy received in said ranges;
    c. detector means connected to said receiver means for quantifying any received radio frequency energy; and
    d. computer means connected to said detector means for evaluating and characterizing any detected radio frequency energy.

9. A detector system as a detector system as claimed in claim 8 wherein the vacuum chamber is evacuated under the control of the computer means.

10. A detector system as claimed in claim 8 wherein the vacuum chamber is a sealed chamber with a sealable opening.

11. A detector system as claimed in claim 8 wherein the vacuum chamber is a partially confined space connected to the ambient environment by baffling means.

12. A detector system as claimed in claim 8 wherein the vacuum chamber is connected to the ambient environment by at least one vent means closed by a frangible member to provide pressure relief for explosive overpressure from materials under evaluation in said chamber.

13. A detector system for detecting low intensity radio frequency emissions comprising:
    a. antenna means positioned to receive radio frequency energy from a specified area, said specified area being a pressure chamber which can be controlled to a partial pressure;
    b. receiver means connected to said antenna means for selecting predetermined frequency ranges for reception and amplifying any radio frequency energy received in said ranges;
    c. detector means connected to said receiver means for quantifying any received radio frequency energy; and
    d. computer means connected to said detector means for evaluating and characterizing any detected radio frequency energy.

14. A method for preventing explosive devices from being introduced into public conveyances or other areas of security concern, comprising the steps of:
    locating a suspect item in a containment vessel shielded from electromagnetic energy; and
    passively detecting in the containment vessel electromagnetic events associated with active or passive electrical fusing used to initiate or detonate any explosive device.

15. The method as described in claim 14 further including the step of:

evaluating and characterizing the electromagnetic events to determine the type of electrical fusing.

16. The method as described in claim 14 further including the step of:

detonating the explosive device in the containment vessel.

17. A method for preventing explosive devices from being introduced into public conveyances, comprising the steps of:

locating a suspect item in a containment vessel shielded from electromagnetic energy;

modifying the pressure in the containment vessel to simulate a predetermined operating condition associated with the public conveyance; and passively detecting in the containment vessel electromagnetic events associated with active or passive electrical fusing used to initiate or detonate an explosive device.

* * * * *